May 15, 1956  R. D. DELAHAY  2,745,660
SEAL DEVICE FOR RECIPROCATING PISTON
Filed May 18, 1953  2 Sheets-Sheet 2

RAYMOND D. DELAHAY
INVENTOR.

BY
ATTORNEYS

United States Patent Office 2,745,660
Patented May 15, 1956

2,745,660

SEAL DEVICE FOR RECIPROCATING PISTON

Raymond D. Delahay, Long Beach, Calif., assignor to Lacy Oil Tool Company, Los Angeles, Calif., a copartnership Application May 18, 1953, Serial No. 355,490

11 Claims. (Cl. 267—1)

This invention relates generally to means for preventing leakage of fluids past pistons reciprocating in cylinders against high unbalanced pressures.

A purpose of the invention is to provide a seal between cylinder wall and piston wall which substantially prevents the passage of fluids from a zone of high pressure to a zone of lower pressure through the annulus between said walls.

A purpose of the invention is to provide a seal between the walls of a cylinder and of a piston reciprocating therein which will effect the transfer, through the annulus between said walls, of a lubricant supplied to the low pressure end of said cylinder into a zone of high pressure at the opposite end.

A purpose of the invention is to provide the reciprocating piston of a liquid pump with a seal against the cylinder wall which will positively prevent back leakage of liquid past the piston.

A purpose of the invention is to so arrange and supplement the metallic piston rings ordinarily used to provide the seal between piston wall and cylinder wall of a pneumatic, well pump counterbalance as to cause the oil used for lubrication to travel past the piston, against the high air pressure maintained in the enclosed space above the piston head, as the cylinder reciprocates with relation to the piston, and thereby to maintain a pool of oil resting on the upper end of the piston.

A purpose of the invention is to provide the piston with a flexible element cooperating with the piston ring to provide an effective check valve preventing return flow of oil into the annulus between piston wall and cylinder wall.

A purpose of the invention is to provide a highly effective seal between piston and cylinder of a pneumatic, well pump counterbalance for preventing escape of air from the high pressure space above the piston at times when the well is idle and the piston stationary in the cylinder.

As above indicated, the invention may be utilized in situations in which the high pressure space is occupied by a liquid, as in liquid pumps, hydraulic rams and the like, and also in situations in which the fluid in the high pressure space is a gas, as in pneumatic counterbalances and gas compressors. In the following discussion it will be described as applied to a pneumatic counterbalance, which offers some problems and some limitations not encountered in the handling of liquids.

In the pumping of oil wells, and particularly wells of considerable depth, it is common and increasing practice to counterbalance the weight of the string of pump rods and part of the weight of the liquid column in the pump tubing by the use of a pneumatic cushion. To this end, a cylinder having its upper end closed or enclosed is hinged to the walking beam at a medial point between the Samson post and the point of suspension of the rod string, and a piston fitting within the cylinder is supported on a rigid piston rod, the lower end of which is pivotally supported from the derrick foundation.

The enclosed space communicating with the high pressure end of the cylinder is filled with air under pressure, usually by means of an auxiliary air compressor, the air pressure fluctuating with the movement of the beam but being maintained at a relatively high level, of the order of several hundred pounds per square inch. The expansive force of this air cushion, acting on the piston head, is utilized in place of dead weight to equalize power consumption between the upstroke and downstroke of the beam.

A major difficulty encountered in the design and use of air counterbalances has been that of preventing leakage of air past the piston. While an auxiliary air compressor may be arranged to start automatically when the air pressure falls below some predetermined level, it is desirable to place as little dependence as possible on automatic means for replenishing the air supply. These pumping units are required to operate for long periods with little or no attendance, and the reduction of air pressure below the optimum level interferes seriously with effective pumping and, if continued too far, may even cause the prime mover to stall and the well to discontinue pumping until next visited by the operator.

Further, unless the make-up compressor is provided with an independent power source subject to automatic control, such as an electric motor, it is useless for maintaining air cushion pressure during periods of idleness of the well, and at such times it is necessary to go through a tedious repressuring operation before the well can again be put to pumping.

Efforts to solve the problem of maintaining pressure at counterbalancing level at all times have heretofore been directed to elaboration of the means for replacing air lost by leakage. I have solved this problem in working in the opposite direction, in providing means for completely and positively preventing air leakage past the piston while the beam is in motion and for substantially preventing leakage during even extended periods of idleness. The requirement for repressuring is thus reduced to those occasions on which the air cushion must be blown down to permit certain operations on the well, and to occasions in which the well is put back on the pump after very long periods of idleness. The very desirable results are minimization of power consumption and of the size and cost of the make-up compressor, and the avoidance of most of the long delays incident to repressuring.

The manner in which this end is accomplished will now be described with reference to the attached drawings and the following description thereof, in which Fig. 1 is a vertical section through an exemplary air reservoir, cylinder and piston of a pneumatic pump counterbalance, illustrating a preferred environment in which the devices of the invention may be used and showing the preferred location on the piston of the ring and groove assemblies of Figs. 2 to 6;

Fig. 7 is a vertical section illustrating a hydraulic ram in which the sealing means of the invention is utilized to prevent leakage of the actuating fluid.

Figure 1:
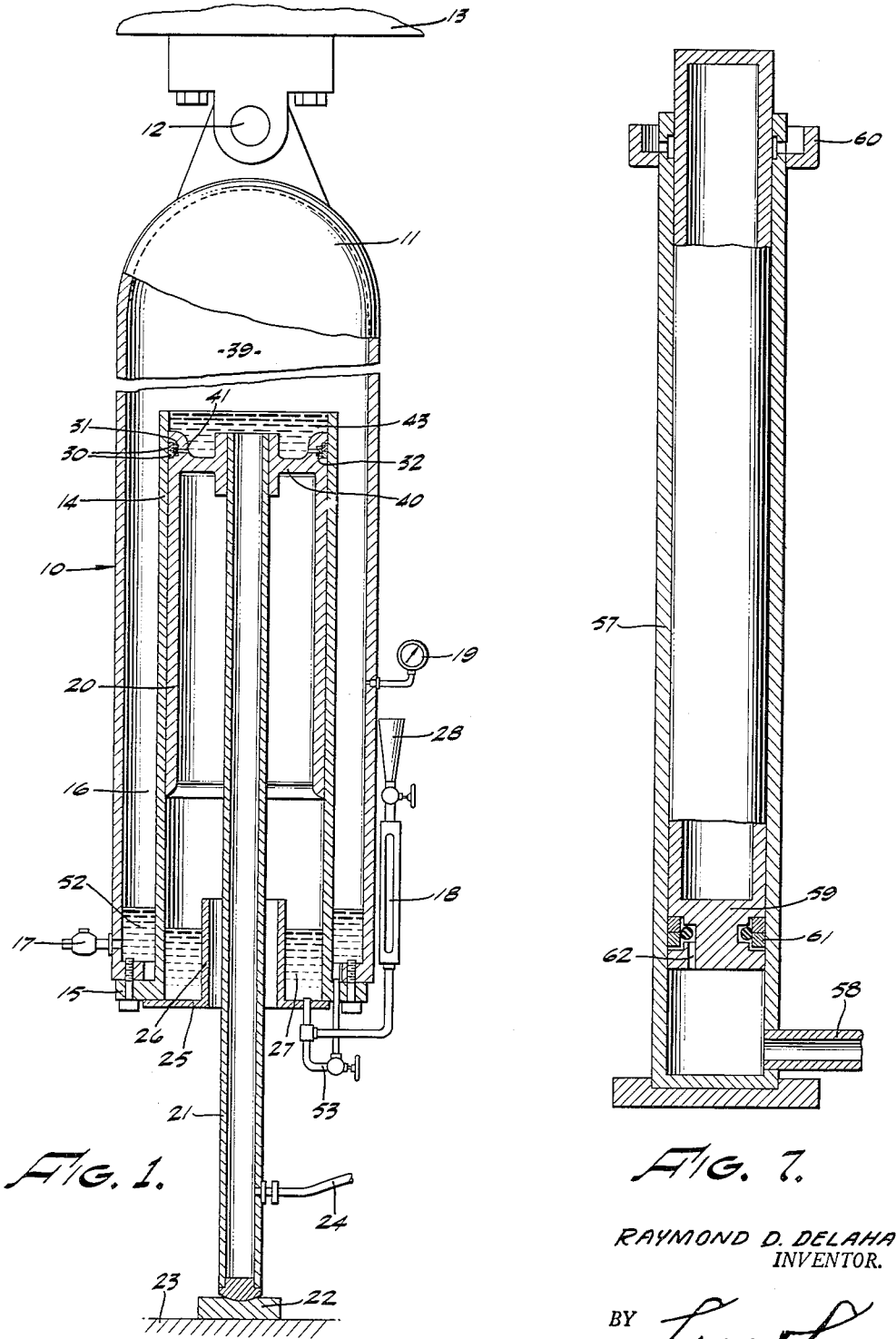

Referring first to Fig. 1, an elongated, cylindrical air receiver 10 having its upper end closed as at 11 is swingingly suspended as at 12 from the lower side of the walking beam 13, of which only a small fragment is shown. Within the reservoir is a cylinder 14 having an end flange 15 bolted to the lower end of the reservoir, leaving an annular space 16 which may be made to increase the capacity of the reservoir to any desired extent. The lower end of this annular space provides a catchment for lubricant overflowing the upper end of the cylinder in the operation of the counterbalance, and a drain cock 17 provides for the removal of accumulated oil at intervals. An oil level gauge glass 18 and a pressure gauge 19 are convenient accessories.

A piston 20, slidably fitted within the cylinder, is carried on a hollow piston rod 21, the lower end of which is pivoted in a shallow cup 22 of spherical curvature, this cup resting on any solid foundation 23. A flexible connection 24 from any air compressor not shown provides for introduction of air for initial pressuring and for make-up of any leakage.

At the lower end of the cylinder an annular plate 25 and an upwardly projected tube 26 form an open oil reservoir in which a pool 27 of lubricating oil is maintained, a filling connection 28 being provided for replenishing this oil supply at intervals.

The lengths of piston rod and air receiver are proportioned to the stroke of the beam that the skirt of the piston dips into oil pool 27 at the end of each upstroke of the cylinder, thus continuously spreading an oil film over its inner wall. The presence of this oil film during operation of the counterbalance is essential to the maintenance of the seal, but this particular manner of producing it, while commonly used, is not the sole method available, a subject which will later be considered.

Up to this point the description is merely of a conventional form of counterbalancing apparatus in which the invention may usefully be employed, but this form will be understood to be illustrative only, and not limiting, the apparatus being subject to many variations in form and arrangement of parts which are well known in the prior art.

The essence of the invention lies in the incorporation and positioning in a piston and cylinder combination of means for causing lubricating oil to pass upwardly around the piston and into the high pressure zone existing above it, so long as the beam is in motion and there is relative reciprocation of the cylinder and piston. This upwardly moving oil supply automatically maintains an oil pool above the piston, this pool affording an absolute seal against leakage of air around the piston and being maintained without the use of any accessory liquid pump or other oil transferring device.

The invention also functions when the beam is idle to retain the oil pool above the piston almost indefinitely, thus causing the air pressure in the reservoir to remain substantially constant at the counterbalancing level, even during protracted periods of idleness of the pumping unit.

The means to both of these ends consists in certain combinations of ring grooves, metallic piston rings and flexible rings cooperating with the metallic rings to function as check valves, and in the location of these grooves in the optimum position along the length of the piston, which will now be described.

Figure 2:
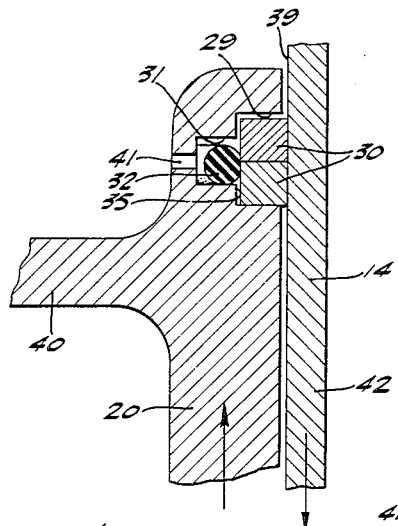
Fig. 2 is a detail, on an enlarged scale and in cross-section, of a fragment of the piston, showing a form of the invention in which the flexible element cooperating with the piston ring to form a check valve is in the form of an O-ring, the rings being in the position in the groove which they assume during the downstroke of the beam.
Figure 3:
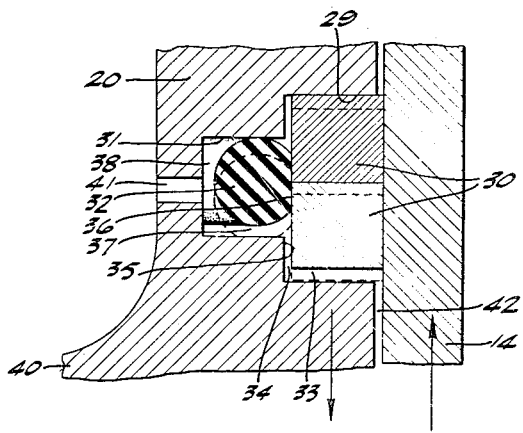
Fig. 3 is a similar detail, on a further enlarged scale, showing the same structure with the rings in the position which they assume during the beam upstroke.

Referring to Figs. 2 and 3, which show the O-ring form of the ring-and-groove assembly in the position in which it has the maximum oil pumping effect, i. e., close to the upper end of the piston: the ring groove consists of a relatively wide outer portion 29 in which a metallic piston ring 30 is located, and a relatively narrow inner portion 31 containing a resilient ring 32 of circular section formed of a rubber-like material not attacked by oils. Such rings are known in commerce as "O-rings" and their ordinary manner of use is described in Christensen Patent 2,509,672. The term "piston ring" as used herein will be understood to refer either to a pair of plain, butt-cut or bevel-cut rings placed side by side or to a single step-cut ring, these forms being fully equivalent for the present purpose.

The width of piston ring 30 is slightly less than that of the upper portion 29 of the groove, permitting the rings a slight end play in the groove, as at 33, as the cylinder reciprocates over the piston. The normal groove clearance of .000" to .004" is sufficient, the clearances in Figs. 2 and 3 being grossly exaggerated. There is also a slight clearance 34 between the inner face of the piston ring and the shoulder 35 between the two portions of the groove.

The width of the O-ring in cross-section is slightly less than that of the inner portion 31 of the groove, and the outside diameter of the O-ring before insertion is slightly greater than the inside diameter of the piston ring 30 after it is contracted by insertion in the cylinder. Thus the O-ring when in position is slightly flattened on the side engaging the inner face of the piston ring, as at 36, and when the rings are in the position shown in Fig. 3, during the upstroke of the cylinder, there is a slight clearance 37 between the lower face of the O-ring and the lower face of inner groove 31. The depth of the inner portion of the groove is such as to leave a free space 38 between its bottom and the inner face of the O-ring, this space communicating with the high pressure zone 39 above the head 40 of the piston through one or more channels or ports 41.

In this combination the O-ring performs its usual function (as described by Christensen) of sealing the circumferential joint of the piston ring, and it also performs an additional function, acting as a check valve which permits oil to bypass the piston ring and enter the space above the piston head during the relative downstroke of the piston and prevents return flow of the oil during the relative piston upstroke or while the piston is stationary as regards the cylinder.

(As the apparatus is illustrated in Fig. 1 and as it is ordinarily arranged, the piston is stationary except for a slight rocking movement of the rod and the cylinder strokes up and down over it, the vertical movement of the piston therefore being referred to as "relative." In other forms of counterbalance the piston rod is attached to the beam and carried through a stuffing box in the cylinder head, the piston movement in such forms being actual.)

This check valve function of the resilient ring is essential to the transfer of oil from the low pressure zone below the piston to the high pressure zone above it, and also to the maintenance of the oil pool on top of the piston while the apparatus is inoperative.

While I do not limit myself to any theory as to how the oil pumping function of this combination is produced—the fact being a matter of observation—I believe that it may be explained in the following manner.

During the relative upstroke of the piston, the inner wall of the cylinder is coated with a film of lubricating oil, by drainage from the piston skirt as it emerges from oil pool 27 or by other means later described.

During the ensuing relative downstroke of the piston the metallic piston ring 30, which fits the cylinder wall closely, wipes off the greater part of this oil film and tends to force the oil downwardly, past the piston to its point of origin at the lower end of the cylinder. The force tending to produce this movement of the wiped-off oil is resisted and in part offset by the resistance to flow of a relatively viscous oil through the narrow annulus between piston and cylinder walls, the pressure against the lower side of the piston ring increases as the relative downstroke progresses, and when this pressure exceeds the pressure existing in the high pressure zone above the piston head the wiped-off oil bypasses the rings through clearances 33, 34, 37 and 38 and passes through port 41 into the high pressure zone, where it enters the oil pool 43 resting on the piston head.

It will be seen that to produce this oil-pumping effect it is essential that there be a continuous channel, during the piston downstroke, between the rings and the lower and inner faces of the groove (as shown in exaggerated form in Fig. 3) and that this channel be vented to the upper side of the piston, as by port 41 or its equivalent.

The functioning of the O-ring as a check valve is due in part to its intrinsic resilience, which renders it deformable under pressure, in part to clearance 38 between its inner face and the bottom of the groove, which permits the O-ring to move out of and into contact with the lower face of the groove.

When the relative upstroke of the piston begins, the pressure created by the wiping of oil from the cylinder wall disappears, and the oil in pool 43 tends to flow back into annulus 42. This backward flow is prevented initially by the slight movement of the piston ring which carries the O-ring into contact with the lower face of inner groove 31. As soon as this contact is effected, the oil pressure from above forces the O-ring into the angle formed by the lower face of inner groove 31 and the inner face of piston ring 30, deforming the ring as illustrated at 32 in Fig. 2 and thus making the tightest possible seal against return flow.

Once this seal is formed it can be broken only by a reversal of the direction of piston movement, and thus oil pool 43 and the pressure in the air cushion above it are maintained at counterbalancing level during protracted shut-down of the pumping apparatus. In practice the air cushion pressure has in this manner been maintained at a substantially constant level during periods of idleness extending to several weeks, while with the seals previously used the pressure falls below the point at which pumping can be started without recharging the reservoir in a matter of a few hours.

Figure 4:
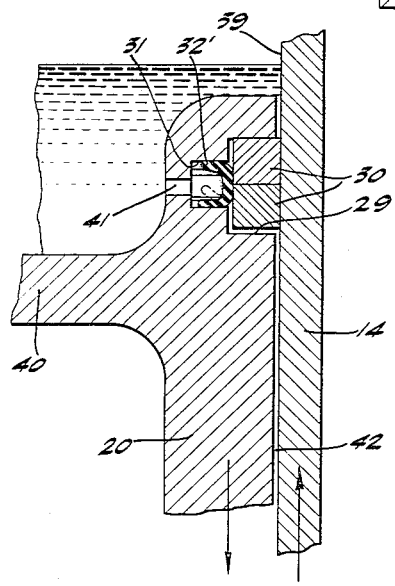
Fig. 4 is a cross-sectional detail of a fragment of the piston, illustrating a form of the invention in which the flexible element cooperating with the piston ring to form a check valve is in the form of a V-ring, the rings being in the position which they assume during the downstroke.

The above described functions of the O-ring may be produced by the use of resilient rings of other sectional form. One such section is shown in Fig. 4, in which the O-ring 32 of Figs 2 and 3 is replaced by a resilient ring 32' of flattened V-section. This ring, as in previous descriptions, is slightly oversize and retained in compression within piston ring 30.

The side members of this V-ring are in contact with both upper and lower wall of inner groove 31 until such time as pressure below the piston ring exceeds the pressure above it, at which time the lower side member of the V-ring will flex inwardly, as indicated by the broken outline, to allow oil to pass into port 41 and through it into oil pool 43.

Figure 5:
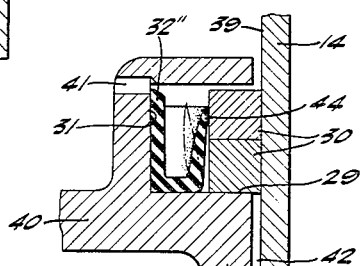
Fig. 5 is a cross-sectional detail of a fragment of the piston, showing a form of the invention in which the flexible element is of modified U-form.

A third, and very desirable form for the resilient ring is shown in Fig. 5, at 32". This specific construction is made the subject of a copending application of D'Errico, Serial No. 355,790, filed May 18, 1953. In this form the lip 44 seals against the inner face of the piston ring when the excess of pressure is from above and flexes inwardly when the excess pressure is from below. This form of ring should be in slight tension on the bottom of the groove when disposed as shown, but if reversed in section, to bring the flexing lip to the bottom of the groove, it will be held in compression within the piston ring.

It will be evident that rings of still other sectional form could be used, and the three rings above described are intended to be suggestive only.

Figure 6:
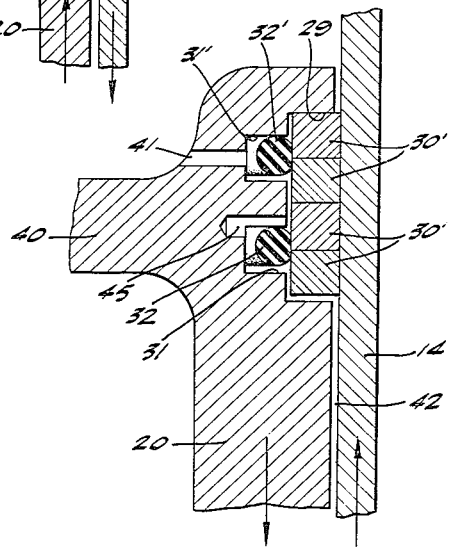
Fig. 6 is a cross-sectional detail of a slightly modified form of the invention in which the ring groove and ring of Figs. 2 and 3 are duplicated and function in series.

A modified form of ring-and-groove assembly in which two flexible check rings are used in series is illustrated in section in Fig. 6.

In this modified form the outer ring groove 29 is of such width as to receive two piston rings 30 and 30', and the two inner grooves 31—31' are located side by side and provided with resilient rings 32—32', shown as O-rings though they may be of other section if preferred. On the relative downstroke of the piston, oil passes through the clearances beneath the lower piston ring 30 and the lower resilient ring 32, then through a port or ports 45 into the space behind the upper piston ring 30', then below the upper resilient ring 32' and thus to the high pressure side of the piston through port 41.

This form has the advantage of placing two check rings in series, so that if one should fail to seat completely, as for example by reason of sediment in the oil, the other would be available for preventing the loss of oil pool 43 during a shut-down period.

The amount of oil transferred from the low pressure to the high pressure side of the piston at each stroke of the beam will vary with the viscosity of the oil, with the relative width of annulus 42 between piston wall and cylinder wall, and with the speed of relative movement of cylinder and piston, none of these factors being readily available for control of this quantity. A definite control over the rate of transfer may, however, be effected by changing the location of the ring-and-groove assembly along the length of the piston.

This follows from the fact that the cylinder and piston must pass through a material part of the total length of stroke before the pressure below piston ring 30 builds up to the point at which it can overcome the air pressure above the piston and thus cause oil to flow into the high pressure zone. Other conditions being equal, the quantity of oil transferred per stroke is a function of the distance between piston ring 30 and the lower end of the piston, the pumping effect being at the maximum when this ring is located close to the upper end of the piston, as illustrated, and disappearing entirely when this ring is located at a variable but highly material distance from the lower end of the piston.

The quantity of oil transferred during a more or less extended period also varies with the manner in which the inner wall of the cylinder is lubricated. When this lubrication is effected by the dipping of the piston skirt into oil pool 27 in the open oil reservoir 26, as in Fig. 1, it has been observed that oil is transferred rather rapidly until the level in the oil pool falls to the point at which the piston skirt dips only a short distance into the oil, as for example about ¼ inch, and that thereafter this transfer becomes very slow or ceases entirely.

The reason for this rather surprising behavior appears to be that as the depth of immersion decreases the quantity of oil spread on the wall during the upstroke likewise decreases, until the point is reached at which the resistance to extrusion, during the downstroke, is insufficient to overcome the static pressure exerted downwardly. But whatever the reason, the substantial cessation of oil transfer at some slight depth of piston skirt immersion is uniformly observed in the operation of this form of lubricating means.

The oil transferred past the piston, as above described, first fills the upper oil pool 43, riding up and down the length of the cylinder on the piston head. If the quantity of oil available in the lower pool 27 is more than sufficient to supply the upper pool, the excess passes over the upper edge of the cylinder at the end of the upstroke and collects in the lower end of the space between cylinder and piston wall, as at 52. This oil may be returned to oil supply pool 27 by occasionally opening the valve in return connection 53.

The principles above set forth may be used to advantage in apparatus in which liquid pressure is applied intermittently to a piston to cause it to reciprocate in a cylinder, as for example in a hydraulic ram or in an actuator for the rod string of a long stroke, deep well pump.

In Fig. 7, illustrating such an application, 57 is a cylinder supplied with a hydraulic fluid such as lubricating oil at its lower end, as at 58, the liquid being introduced beneath piston 59 to extrude the piston and lift the applied load and alternately withdrawn to produce the downstroke.

A cup 60 surrounding the piston at the upper end of the cylinder contains a liquid lubricant which coats the piston wall and fills the annulus between cylinder and piston as the piston descends. At or near the lower end of the piston a ring-and-groove assembly 61, which may be of any of the forms previously described, has its groove vented to the high pressure space below the piston through a port 62.

In the operation of this structure, lubricant will be transferred from the low pressure to the high pressure end of the annulus during the greater part, at least, of the lifting stroke; the preponderating movement of lubricant will be toward the high pressure zone, and leakage of actuating fluid is positively inhibited without burdening the lifting stroke with frictional load resulting from the use of tight packing glands.

Having fully described my invention, it is to be understood that I do not wish to be limited to the details herein set forth, but my invention is of the full scope of the appended claims.

I claim:

1. A pneumatic counterbalance for oil well pumps, comprising: a cylinder open to atmospheric pressure at its lower end and having at its lower end a lubricant reservoir; a piston slidable relative to said cylinder and forming therewith a high pressure chamber at the upper end of said piston, said piston having a skirt adapted to dip into said reservoir and coat the walls of said cylinder with a lubricant film during upstroke of said piston; the confronting walls of said piston and cylinder defining an annulus adapted to receive said lubricant film; a seal ring groove in one of said confronting walls and a lubricant passage leading therefrom to said high pressure chamber; a metal ring capable of limited axial displacement within said groove and defining therewith a lubricant flow channel from said annulus to said lubricant passage, and intimately engageable with the other of said confronting walls to deflect lubricant into said flow channel; and a check valve ring of distortable material disposed behind said metal ring and operable to close said flow channel against back flow of lubricant from said lubricant passage to said annulus.

2. A pneumatic counterbalance for oil well pumps, comprising: a cylinder open to atmospheric pressure at its lower end and having at its lower end a lubricant reservoir; a piston slidable relative to said cylinder and forming therewith a high pressure chamber at the upper end of said piston, said piston having a skirt adapted to dip into said reservoir and coat the walls of said cylinder with a lubricant film during upstroke of said piston; at least one seal ring interposed between said piston and cylinder; a bypass around said seal ring having an intake end communicating with the annular region between the confronting walls of said piston and cylinder at the low pressure chamber side of said seal ring, and having a discharge end communicating with said high pressure chamber; a check valve element in said bypass preventing back flow through said bypass from said high pressure chamber; and a lubricant pump incorporating the confronting walls of said piston and cylinder and said seal ring to divert at least a portion of said lubricant through said bypass into said high pressure chamber during relative reciprocation of said piston and cylinder.

3. In combination with a cylinder member having a piston member slidably mounted therein and defining a low pressure zone at one end of the piston member and a high pressure zone at the other end of said piston member, the members having confronting walls defining a lubrication annulus, a combined lubricant pump and seal means, comprising: means for supplying a liquid lubricant to said annulus from the low pressure zone; a circumferential groove formed in one of said confronting walls; a ring in said groove sealingly engaging the other of said confronting walls; means defining a passage on the member having said groove, said passage bypassing said ring and having an intake end communicating with said lubrication annulus at the low pressure zone side of said ring and an outlet end communicating with said high pressure zone; and a check valve in said passage permitting flow of lubricant from said lubrication annulus to said high pressure zone, when the lubricant pressure therein exceeds the pressure in said high pressure zone, but preventing back flow of said lubricant.

4. In combination with a cylinder member having a piston member slidably mounted therein and defining a low pressure zone at one end of the piston member and a high pressure zone at the other end of said piston member, the members having confronting walls defining a lubrication annulus, a combined lubricant pump and seal means comprising: means for supplying a liquid lubricant to said annulus from the low pressure zone; a circumferential groove formed in one of said confronting walls; a seal ring in said groove sealingly engageable with the other of said confronting walls; a deformable check valve ring in said groove behind said seal ring; and means including said groove defining a bypass on the member having said groove, said bypass having an intake end communicating with said lubrication annulus and an outlet end communicating with said high pressure zone, thereby to divert lubricant from said lubricant annulus, when the lubricant pressure therein exceeds the pressure in said high pressure zone, said check valve ring being within said bypass and operable to prevent back flow from said high pressure zone to said lubricant annulus.

5. A combination as set forth in claim 1, wherein: said check valve ring is an O-ring.

6. A combination as set forth in claim 1, wherein: said check valve ring is substantially U-shaped in cross-section with its web engaging said first ring and its flanges projecting radially.

7. A combination as set forth in claim 1, wherein: a plurality of metal rings are disposed in said seal ring groove, and said lubricant flow channel includes a pair of annular recesses behind said metal ring and each recess receives a check valve ring, said recesses being interconnected and check valve rings being operable in series.

8. A combination as set forth in claim 2, wherein: said check valve element is substantially U-shaped in cross-section with its web engaging said first ring and its flanges projecting radially.

9. A combination as set forth in claim 2, wherein: a plurality of seal rings are provided, and a pair of check valve elements are series-disposed in said by-pass.

10. A combination as set forth in claim 3, wherein: a plurality of rings are provided in said circumferential groove; said passage means by-passes all of said rings; and a pair of series-disposed check valves are provided in said passage means.

11. A combination as set forth in claim 4, wherein: a plurality of seal rings are disposed in said seal ring groove; and a pair of deformable check valve rings are disposed behind said seal rings and arranged in series within said by-pass.

References Cited in the file of this patent

UNITED STATES PATENTS

| | | |
|---|---|---|
| 2,468,980 | Huber | May 3, 1949 |
| 2,607,644 | Smith | Aug. 19, 1952 |
| 2,614,793 | Storm | Oct. 21, 1952 |
| 2,615,769 | Barnes | Oct. 28, 1952 |
| 2,665,901 | Patterson | Jan. 12, 1954 |